(12) United States Patent
Idies et al.

(10) Patent No.: US 11,415,222 B2
(45) Date of Patent: Aug. 16, 2022

(54) SEALING BELLOWS

(71) Applicant: Carl Freudenberg KG, Weinheim (DE)

(72) Inventors: Nedal Idies, Berlin (DE); Rainer Knorr, Berlin (DE)

(73) Assignee: CARL FREUDENBERG KG, Weinheim (DE)

( * ) Notice: Subject to any disclaimer, the term of this patent is extended or adjusted under 35 U.S.C. 154(b) by 19 days.

(21) Appl. No.: 16/847,687

(22) Filed: Apr. 14, 2020

(65) Prior Publication Data
US 2020/0332829 A1 Oct. 22, 2020

(30) Foreign Application Priority Data
Apr. 16, 2019 (DE) ...................... 10 2019 110 034.8

(51) Int. Cl.
F16J 3/04 (2006.01)
F16C 11/06 (2006.01)
F16J 15/34 (2006.01)
F16J 15/36 (2006.01)

(52) U.S. Cl.
CPC ........... F16J 3/042 (2013.01); F16C 11/0671 (2013.01); F16J 15/344 (2013.01); F16J 15/36 (2013.01)

(58) Field of Classification Search
CPC .... F16J 3/02; F16J 3/042; F16J 15/344; F16J 15/36; F16C 11/0671
See application file for complete search history.

(56) References Cited

U.S. PATENT DOCUMENTS

| 4,322,175 | A | * | 3/1982 | Szczesny | F16B 21/20 277/635 |
| 5,374,037 | A | * | 12/1994 | Bledsoe | F16F 9/0463 267/64.24 |
| 5,466,084 | A | * | 11/1995 | Brueggen | F16C 11/0671 403/134 |
| 6,474,630 | B1 | * | 11/2002 | Weitzenhof | F16F 9/0463 267/122 |
| 7,530,575 | B2 | * | 5/2009 | Ota | F16J 3/042 277/635 |
| 7,670,078 | B2 | * | 3/2010 | Elterman | F16C 11/0671 403/134 |
| 7,931,279 | B2 | * | 4/2011 | Niwa | F16J 3/042 277/630 |
| 7,980,564 | B2 | * | 7/2011 | Niwa | F16C 11/0671 277/634 |
| 8,028,999 | B2 | * | 10/2011 | Wolf | F16D 3/845 277/634 |

(Continued)

FOREIGN PATENT DOCUMENTS

| CN | 203717926 U | 7/2014 |
| DE | 102006039614 B3 | 4/2008 |

(Continued)

Primary Examiner — Nicholas L Foster
(74) Attorney, Agent, or Firm — Leydig, Voit & Mayer, Ltd.

(57) ABSTRACT

A sealing bellows includes a casing. The casing includes a rubber-elastic material, which includes an edge region at the front side on both sides. A clamping ring for fastening the sealing bellows to a machine element is arranged in at least one of the edge regions. The clamping ring is formed by an annular disk which, viewed in the circumferential direction, has a meander-like configuration.

20 Claims, 3 Drawing Sheets

(56) References Cited

U.S. PATENT DOCUMENTS

| | | | | |
|---|---|---|---|---|
| 9,206,837 B2* | 12/2015 | Ishimori | ................... | F16J 15/52 |
| 9,790,983 B2* | 10/2017 | Kopsie | ................ | F16C 11/0671 |
| 10,156,268 B2* | 12/2018 | Cassell | ................... | F16D 3/845 |
| 10,359,071 B2* | 7/2019 | Parker | ................... | F16C 11/069 |
| 2002/0153646 A1* | 10/2002 | Weitzenhof | .............. | F16J 3/042 |
| | | | | 267/64.27 |
| 2004/0056434 A1* | 3/2004 | Wolf | ....................... | F16D 3/845 |
| | | | | 277/634 |
| 2007/0071546 A1* | 3/2007 | Ota | .......................... | B62D 3/12 |
| | | | | 403/50 |
| 2009/0209353 A1* | 8/2009 | Abels | .................. | F16C 11/0671 |
| | | | | 464/106 |
| 2016/0281771 A1* | 9/2016 | Hosen | ................ | F16C 11/0671 |
| 2018/0135691 A1* | 5/2018 | Parker | ................... | F16C 11/086 |

FOREIGN PATENT DOCUMENTS

| | | |
|---|---|---|
| DE | 102016204292 A1 | 9/2017 |
| EP | 1852617 A1 | 11/2007 |
| EP | 2054648 B1 | 4/2016 |
| EP | 3076033 A1 | 10/2016 |
| EP | 3184832 A1 | 6/2017 |

\* cited by examiner

SEALING BELLOWS

CROSS-REFERENCE TO PRIOR APPLICATIONS

Priority is claimed to German Patent Application No. DE 10 2019 110 034.8, filed on Apr. 16, 2019, the entire disclosure of which is hereby incorporated by reference herein.

FIELD

The invention relates to sealing bellows.

BACKGROUND

Sealing bellows are generally known, for example from EP 2 054 648 B1, and can be used for sealing ball joints. Ball joints, in particular when used in motor vehicles, must be protected against the penetration of dirt and moisture, in order to ensure low maintenance intensity and a long service life of the ball joints. Sealing bellows are used for sealing two machine elements that are movable relative to one another. In the case of ball joints, the machine elements which can be moved relative to one another are a ball pivot and a housing, wherein the ball pivot is mounted pivotably and rotatably in the housing of the ball joint.

SUMMARY

In an embodiment, the present invention provides a sealing bellows including a casing. The casing includes a rubber-elastic material, which includes an edge region at the front side on both sides. A clamping ring for fastening the sealing bellows to a machine element is arranged in at least one of the edge regions. The clamping ring is formed by an annular disk which, viewed in the circumferential direction, has a meander-like configuration.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
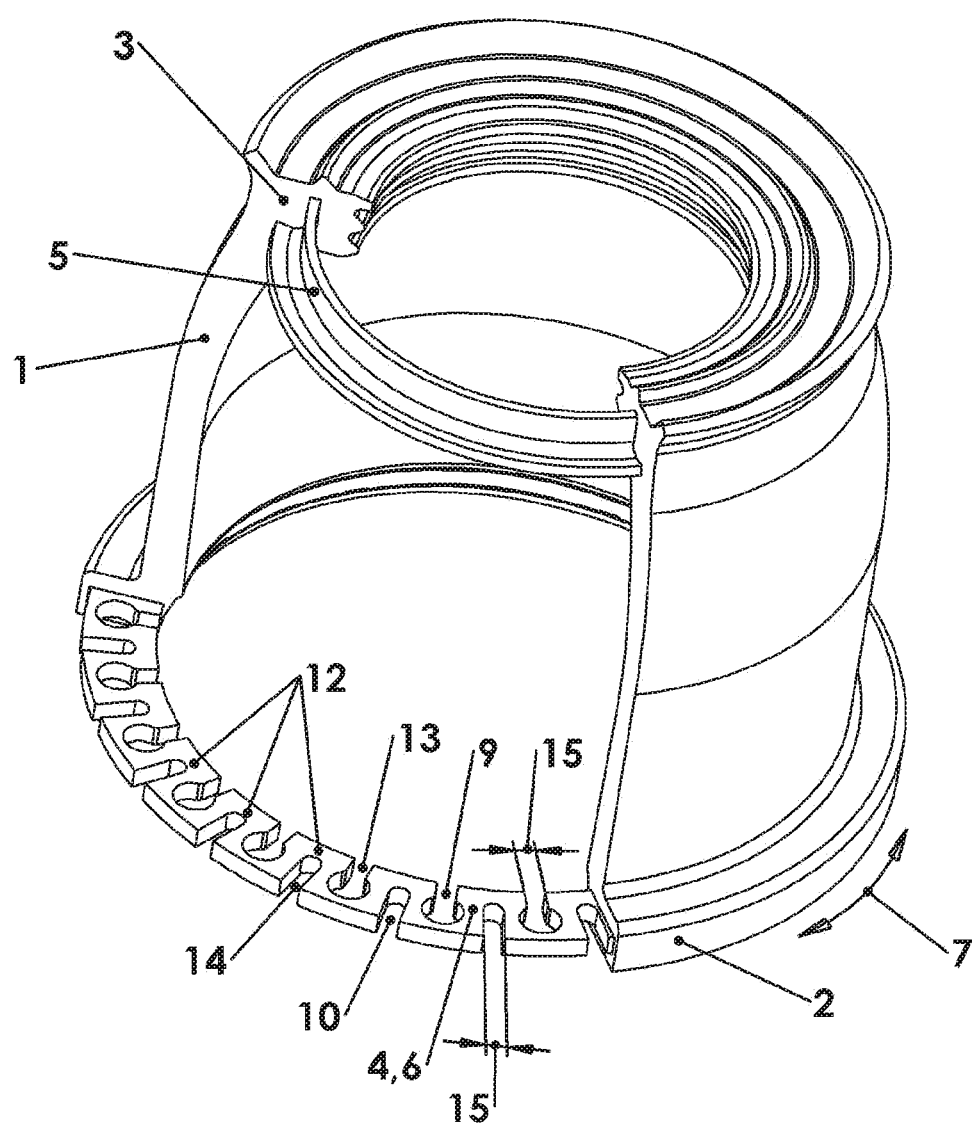
FIG. 1 is an exemplary embodiment of the sealing bellows in perspective view, wherein the clamping rings are shown only partially embedded in the corresponding edge regions in order to clarify their shape.

The sealing bellows used for sealing the machine elements of EP 2 054 648 B1, which can be moved relative to one another, has two edge regions which are arranged adjacent to one another at an axial distance and are connected to one another by the casing. One of the edge regions bears in a sealing manner on the ball pivot and forms a sealing region, while the axially opposite other edge region is connected to the housing of the ball joint in a force-fitting and/or form-fitting manner and forms a fastening region. The fastening region usually seals statically with respect to the housing. In contrast, the sealing region slides on the ball pivot and seals the ball joint dynamically in all positions. The ball pivot rotates about its own axis and pivots about the ball center. The clamping elements integrated into the edge regions are protected against corrosion, loss or damage, for example by stone impact. Possible damage to the sealing bellows, which can arise, among other things, during the assembly of external clamping rings, is avoided by the use of clamping rings integrated into the edge regions.

The edge region of the previously known sealing bellows, which forms the fastening region, encloses a spring ring embodied as a clamping ring. The spring ring is vulcanized into the fastening region. The elastic properties of the spring ring make it possible for the sealing bellows to be pulled with its fastening region over the part of a machine element to be sealed and to bear in a sealing manner on the machine element to be sealed. The spring ring has retaining claws on the inside in the radial direction, which are arranged at an angle to an axial projection of the spring ring and are distributed uniformly over the circumference of the spring ring. The retaining claws are hinged in an elastically flexible manner on the axial projection. Viewed in section, the spring ring has an essentially L-shaped design.

The angle at which the retaining claws are connected to the axial projection in a radially flexible manner makes it possible to fix the fastening region of the sealing bellows to the machine element to be sealed. In this type of clamping rings, the retaining claws are deformed and the axial protrusion twists outwards.

However, the tightness of the connection between the fastening region of the sealing bellows and the machine element to be sealed depends on whether the machine element to be sealed is concentrically enclosed by the fastening region. A prerequisite for this is a uniform contact of the retaining claws on the machine element. A uniform contact presupposes an optimally centered allocation of the machine element and the fastening area to one another in order to avoid the undesired deformation of the clamping ring and resultant undesired leakage.

An embodiment of the invention provides a sealing bellows of the type mentioned at the outset in such a way that the simplified assembly of the sealing bellows and the improved sealing of at least one edge region on the corresponding machine element are achieved. In particular, automatic centering results during the assembly of the at least one edge region on the corresponding machine element.

In an embodiment, the clamping ring is formed by an annular disk which, viewed in the circumferential direction, has a meander-like configuration.

Due to the meander-like configuration of the annular disc, the clamping ring used in the edge region of the sealing bellows is elastically flexible in the radial direction and can thereby expand in the radial direction when pushed onto the machine element to be sealed. The clamping ring has an elastically variable diameter.

The edge region is mounted on the machine element to be sealed by radial forces distributed uniformly in the circumferential direction. As a result, the clamping ring grips uniformly on the machine element in the circumferential direction and ensures a force-fitting and tight connection during a long service life.

In contrast, clamping rings of the prior art, which are essentially L-shaped, with an axial projection formed in a self-contained manner, do not have a diameter which would be elastically flexible and thus variable in size.

In an advantageous embodiment, it can be provided that the clamping ring is arranged in a form-fitting manner in the respective edge region without any chemical connection.

In the prior art, the clamping rings are usually embedded in the edge regions during a vulcanization process, in such a way that the clamping rings consisting of a metallic material are coated beforehand with an adhesion promoter, which is subsequently necessary for a firmly bonded connection to the rubber-elastic material of the edge regions. The coating of the clamping rings with an adhesion promoter is complex, cost-intensive and harmful to the environment. In order to coat the clamping rings with an adhesion promoter, the use of different chemicals and machines is required. Apart from the fact that such a pretreatment of the clamping rings with the adhesion promoter is complex and expensive, the pretreatment of the clamping ring with the adhesion promoter results in considerable amounts of contaminated chemicals which have to be disposed of as hazardous waste or processed in a complex recycling process.

Chemical bonding is unnecessary due to the clamping ring that is arranged in an exclusively form-fitting manner in the respective edge region. An advantage to be emphasized thereby is that the sealing bellows overall can be produced simply, cost-effectively and in an environmentally friendly manner. In order to produce the sealing bellows, clamping rings, which are not pre-treated and, in particular, not provided with an adhesion promoter, are inserted into a vulcanization tool, positioned and subsequently extrusion-coated with the rubber-elastic material of which the casing and the edge regions consist.

The clamping ring consists of a tough material, in particular of a metallic material. The clamping ring can include (e.g., consist of), for example, spring steel. Such clamping rings can be produced simply and cost-effectively in virtually all necessary sizes and are, therefore, also well-suited for sealing bellows produced on a large-scale. Instead of a metallic material, polymeric materials can also be used.

In an advantageous embodiment, it is provided that the clamping ring has first through-holes on the inside in the radial direction and second through-holes on the outside in the radial direction, such that the first through-holes and the second through-holes are each, when viewed in the circumferential direction, arranged adjacent to one another at a distance, wherein the first and the second through-holes are arranged in a common, notional radial plane.

As a result of the embodiment described above, the clamping ring has an elastically variable diameter and thereby centers itself essentially automatically on the machine element to be sealed, for example on the housing of a ball joint for chassis, stabilizers or steering systems in motor vehicles.

The material and the shape of the annular disk having a meander-like configuration, in particular the shape of the through-holes, influence the use properties of the clamping ring, in particular its behavior during radial processing, and the radial force with which the edge region uniformly encloses the machine element to be sealed when the sealing bellows is mounted, viewed in the circumferential direction.

Viewed in the circumferential direction, the first through-holes delimit retaining claws, through which the sealing bellows can be fastened with its corresponding edge region to the machine element. The inner circumference of the retaining claws can touch the surface of the machine element to be sealed, for example by bearing directly against each other, because the inner circumference of the retaining claws forms a component of the inner circumference of the corresponding edge region.

According to another embodiment, namely at the point when the inner circumference of the retaining claws is also covered by the rubber-elastic material of the corresponding edge region, the retaining claw exerts a clamping force on the surface of the machine element to be sealed by means of a rubber layer by which it is covered.

The first openings are preferably embodied in an essentially $\Omega$ shape and have first openings on the inside in the radial direction. In this case, it is advantageous that the radial flexibility is increased and the area of the through-hole is expanded. As a result, the rubber can better flow through the clamping ring.

By way of contrast, the second through-holes are preferably of an essentially U-shaped design and have second openings which are in the radial direction. In this case, it is advantageous that the radial flexibility is increased and at the same time sufficient material is still present in order to ensure the stiffness of the clamping ring.

If the first and the second through-holes were of the same design, for example in a $\Omega$-shape or U-shape, this would generally be possible, but such a clamping ring would have the following disadvantages and thus poorer use properties: If the through-holes were all U-shaped, the flexibility would probably not be sufficient. By way of contrast, if the through-holes were all $\Omega$-shaped, the clamping ring would not be stable/stiff enough.

Both the $\Omega$-shaped and the U-shaped through-holes each have the advantage that undesired notch effects in the groove base are avoided because of the rounded groove base in each case. The risk of damage/destruction of the clamping ring during its radial softening during the assembly of the sealing bellows is thereby limited to a minimum.

The first and second openings may have essentially the same width when viewed in the circumferential direction. The first and second through-holes may each have an essentially equal radial depth. This results in the same elastic flexibility in the radial direction in each circumferential region of the clamping ring. Thus, self-centering the edge region provided with the clamping ring on the machine element to be sealed works particularly well.

FIG. 1 shows a first exemplary embodiment of the sealing bellows in perspective view. In order to be able to show the shape of the clamping rings 4, 5 to be used more clearly in the corresponding edge regions 2, 3, the clamping rings 4, 5 are shown only partially enclosed by the rubber-elastic material of the edge regions 2, 3. In order to clarify the embodiment, a segment is also separated out from the casing 1.

With the exception of the clamping rings 4, 5, the sealing bellows includes (e.g., consists of) integrally a rubber-elastic material. In the exemplary embodiment shown, the casing 1 has no folds; alternatively, the sealing bellows could be designed as a concertina-type bellows.

In the exemplary embodiment shown, the clamping rings 4, 5 are integrated into the respective edge regions 2, 3, wherein at least the clamping ring 4 is held in the respective edge region 2 in a form-fitting manner without chemical bonding.

As described above, the production of the sealing bellows is thereby simplified. The sealing bellows can be produced simply and cost-effectively, and chemicals, which, following the production of the sealing bellows, would have to be disposed of as hazardous waste or supplied to a complex recycling process, do not arise during the embedding of the clamping ring 4 into the edge region 2.

In the exemplary embodiment shown, the clamping rings 4, 5 each comprise a metallic material.

The clamping rings 4, 5 differ from one another in their design. The clamping ring 4 in the edge region 2, which forms a fastening region of the sealing bellows and seals statically with respect to a machine element, is designed as an annular disk 6 which, viewed in the circumferential direction 7, has a meander-like configuration.

In contrast, the clamping ring 5 in the axially opposite edge region 3 is essentially L-shaped. This edge region forms the sealing region which encloses the corresponding machine element in a dynamically sealing manner.

The clamping ring 4 has first through-holes 9 on the inside in the radial direction 8 which, viewed in the circumferential direction 7, delimit retaining claws 12. In the exemplary embodiment shown, the first through-holes 9 are essentially Ω-shaped and have first openings 13 on the inside in the radial direction 8.

Moreover, in the radial direction 8, the clamping ring 4 has second through-holes 10 on the outside, which viewed in the circumferential direction 7, are arranged adjacent to each other at a distance, just like the first through-holes 9.

For the elastic variability of the diameter of the clamping ring 4, it is crucially important, in an embodiment, that the clamping ring 4 has an annular shape and a meander-like configuration, wherein the first 9 and the second through-holes 10 are arranged in the common, notional radial plane 11.

Figure 2:
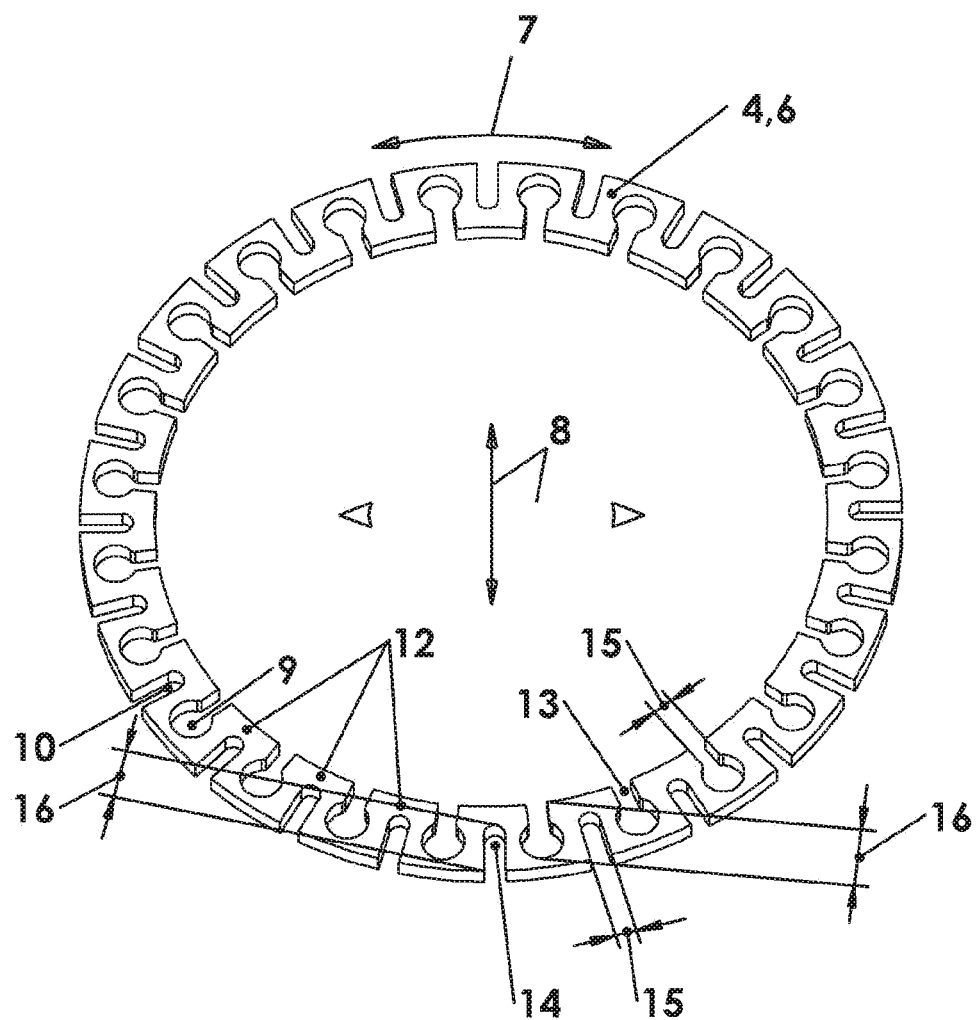
FIG. 2 is one of the clamping rings which has the relative larger diameter and is arranged in the edge region which forms the fastening region, according to an embodiment.

FIG. 2 shows the clamping ring 4 from FIG. 1 as an individual part in its production-related form.

During the mounting of the sealing bellows onto the machine element to be sealed, the fastening region of the sealing bellows is elastically widened in the radial direction 8, which is easily possible due to the meander-like configuration of the clamping ring 4.

Figure 3:
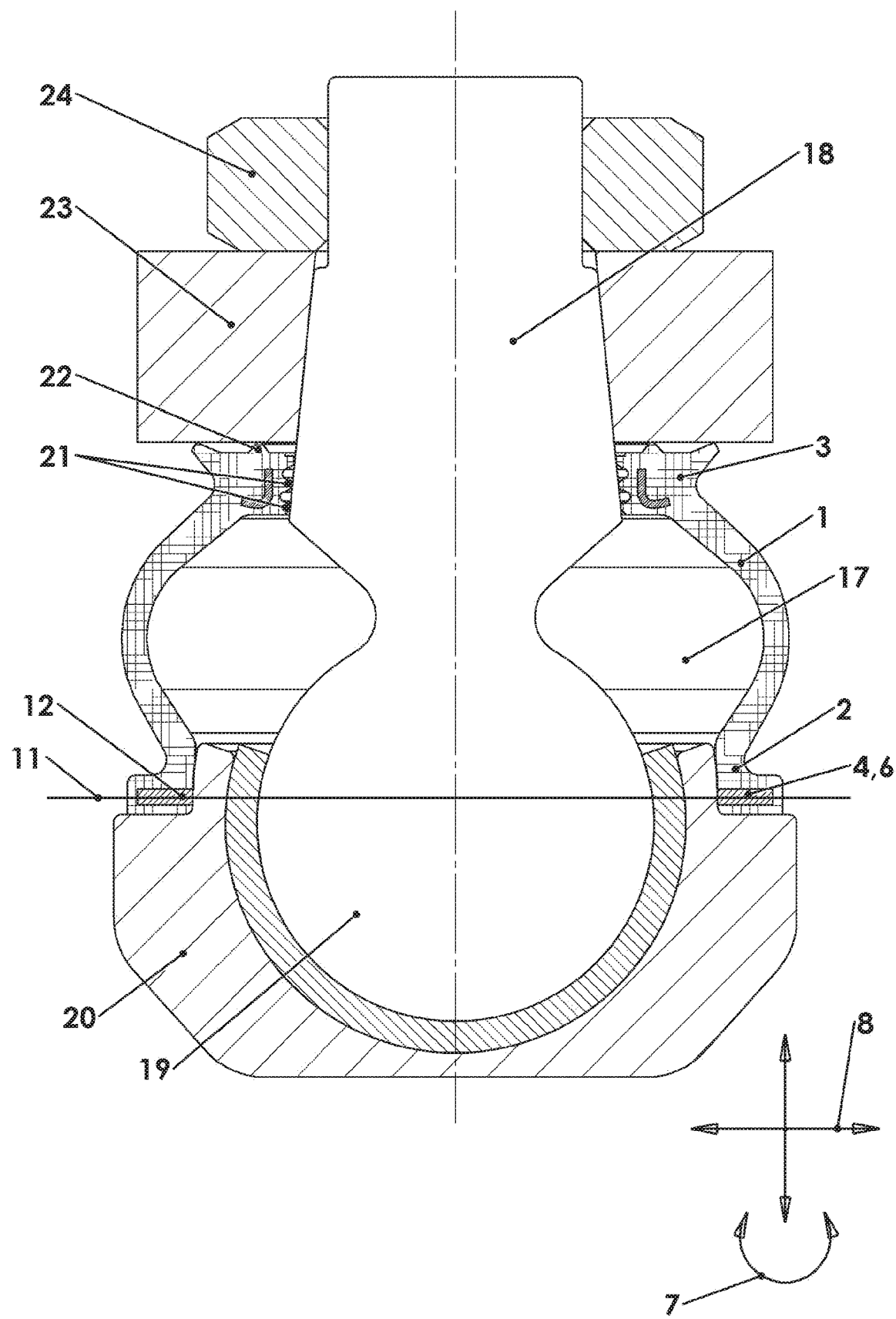
FIG. 3 an exemplary embodiment of a sealing bellows arrangement in which the sealing bellows of FIG. 1 is used.

FIG. 3 shows the sealing bellows of FIG. 1 according to an embodiment of the invention during its intended use in the installed state. The sealing bellows arrangement comprises a ball joint 17 with a ball pivot 18, the joint ball 19 of which is mounted rotatably and pivotably within a housing 20. The sealing bellows is attached to the housing 20 in a statically sealing manner by the clamping element 4 in the edge region 3.

On the other hand, the edge region 3 encloses the ball pivot 18 of the ball joint 17 at the end face, wherein the edge region 3 encloses the ball pivot 18 radially on the inside with sealing lips 21 in a sealing manner. At the end face, on the side of the edge region 3 facing away axially from the edge region 4, an axial sealing lip 22 is arranged which touches a lever socket 23 of the ball joint 17 in a sealing manner. The sealing lips 21 and the axial sealing lip 22 seal dynamically. The lever socket 23 is held in position by a fastening element 24 in the form of a nut screwed onto the ball pivot 18.

In the installed state, the sealing bellows, relative to its production-related form shown in FIG. 1, is compressed in the axial direction, so that in the exemplary embodiment shown here an essentially spherical shape of the casing 1 results.

Geometries of the casing 1 deviating therefrom, for example a pleated casing with two folds, are likewise possible.

In an embodiment, a sealing bellows includes a casing 1 consisting of a rubber-elastic material, which has an edge region 2, 3 at the front side on both sides. A clamping ring 4, 5 for fastening the sealing bellows to a machine element is arranged in at least one of the edge regions 2, 3. The clamping ring 4, 5 is formed by an annular disk 6 which, viewed in the circumferential direction 7, has a meander-like configuration.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sealing bellows comprising:
   a casing comprising a rubber-elastic material, wherein the casing comprises a first edge region at a first side of the casing and a second edge region at a second side of the casing that is disposed opposite the first side; and
   a clamping ring arranged in the first edge region, wherein:
   the clamping ring has an elastically variable diameter,
   the clamping ring is self-centering and has a meander-like configuration in a circumferential direction of the clamping ring, and
   the meander-like configuration is defined by a radially alternating pattern approximating a square wave.

2. The sealing bellows according to claim 1, wherein the clamping ring is arranged in a form-fitting manner in the respective edge region without chemical bonding.

3. The sealing bellows according to claim 1, wherein the clamping ring is made of a metallic material.

4. The sealing bellows according to claim 3, wherein the clamping ring is made of spring steel.

5. The sealing bellows according to claim 1, wherein the clamping ring has first through-holes that intersect an inner edge of the clamping ring in a radial direction and second through-holes that intersect an outer edge of the clamping ring in the radial direction, such that the first through-holes and the second through-holes are each arranged adjacent to one another at a distance in the radial direction.

6. The sealing bellows according to claim 5, wherein the first through-holes delimit retaining claws configured to clamp to a machine element.

7. The sealing bellows according to claim 5, wherein the first through-holes are essentially Ω-shaped and have first openings on an inner face of the clamping ring in the radial direction.

8. The sealing bellows according to claim 7, wherein the second through-holes are essentially U-shaped and have second openings on an outer face of the clamping ring in the radial direction.

9. The sealing bellows according to claim 8, wherein the first and the second openings have essentially the same width in the circumferential direction.

10. The sealing bellows according to claim 5, wherein the first through-holes and the second through-holes each have an essentially equal radial depth.

11. A sealing bellows comprising:
a casing comprising a rubber-elastic material, wherein the casing comprises a first edge region at a first side of the casing and a second edge region at a second side of the casing that is disposed opposite the first side; and
a clamping ring arranged in the first edge region, wherein:
the clamping ring is formed by an annular disk with an elastically variable diameter,
the clamping ring is self-centering and has a meander-like configuration in a circumferential direction of the clamping ring, and
the clamping ring has first through-holes that intersect an inner edge of the clamping ring in a radial direction and second through-holes that intersect an outer edge of the clamping ring in the radial direction, such that the first through-holes and the second through-holes are each arranged adjacent to one another at a distance in the radial direction.

12. The sealing bellows according to claim 11, wherein the clamping ring is arranged in a form-fitting manner in the respective edge region without chemical bonding.

13. The sealing bellows according to claim 11, wherein the clamping ring is made of a metallic material.

14. The sealing bellows according to claim 13, wherein the clamping ring is made of spring steel.

15. The sealing bellows according to claim 11, wherein the first through-holes delimit retaining claws configured to clamp to a machine element.

16. The sealing bellows according to claim 11, wherein the first-through-holes are essentially Ω-shaped and have first openings on an inner face of the clamping ring in the radial direction.

17. The sealing bellows according to claim 16, wherein the second through-holes are essentially U-shaped and have second openings on an outer face of the clamping ring in the radial direction.

18. The sealing bellows according to claim 17, wherein the first and the second openings have essentially the same width in the circumferential direction.

19. The sealing bellows according to claim 11, wherein the first through-holes and the second through-holes each have an essentially equal radial depth.

20. A sealing bellows comprising:
a casing comprising a rubber-elastic material, wherein the casing comprises a first edge region at a first side of the casing and a second edge region at a second side of the casing that is disposed opposite the first side; and
a clamping ring having an elastically variable diameter arranged in the first edge region, wherein:
the clamping ring is configured to be self-centering, and
the clamping ring comprises an inner circumference and an outer circumference, the clamping ring having a meander-like configuration defined by a radially alternating pattern of first recesses along the inner circumference and outer recesses along the outer circumference that approximate a square wave.

* * * * *